(12) United States Patent
Sauber et al.

(10) Patent No.: US 7,032,052 B2
(45) Date of Patent: Apr. 18, 2006

(54) INFORMATION HANDLING SYSTEM CAPABLE OF OPERATING WITH MULTIPLE TYPES OF EXPANSION CARDS IN A COMMON INDUSTRY STANDARD CONNECTOR

(75) Inventors: William F. Sauber, Georgetown, TX (US); James Brewer, Leander, TX (US); David Konetski, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 258 days.

(21) Appl. No.: 10/758,635

(22) Filed: Jan. 15, 2004

(65) Prior Publication Data

US 2005/0160214 A1 Jul. 21, 2005

(51) Int. Cl.
*G06F 13/00* (2006.01)

(52) U.S. Cl. ....................................................... 710/301
(58) Field of Classification Search ......... 710/301–304
See application file for complete search history.

(56) References Cited

U.S. PATENT DOCUMENTS

| | | | | |
|---|---|---|---|---|
| 5,748,913 | A * | 5/1998 | Shibahara | 710/301 |
| 5,768,612 | A * | 6/1998 | Nelson | 712/32 |
| 5,812,801 | A * | 9/1998 | Saperstein et al. | 710/305 |
| 6,044,423 | A * | 3/2000 | Seo et al. | 710/302 |
| 6,311,165 | B1 * | 10/2001 | Coutts et al. | 705/21 |
| 6,516,357 | B1 * | 2/2003 | Hamann et al. | 710/2 |
| 6,549,967 | B1 * | 4/2003 | McTague | 710/302 |
| 6,718,274 | B1 * | 4/2004 | Huang et al. | 702/64 |
| 6,836,814 | B1 * | 12/2004 | Takaoka et al. | 710/316 |
| 2004/0117512 | A1 * | 6/2004 | Morgerm et al. | 710/1 |
| 2005/0059301 | A1 * | 3/2005 | Chou et al. | 439/660 |
| 2005/0097253 | A1 * | 5/2005 | Wang et al. | 710/301 |
| 2005/0132236 | A1 * | 6/2005 | Srinivasan et al. | 713/300 |

OTHER PUBLICATIONS

Bhatt, A., "Creating a Third Generation I/O Interconnect", Intel Corporation, Technology and Research Labs.
Intel Corporation, "Audio Codec '97, Revision 2.3, Revision 1.0", pp. 1-108, Apr. 2002.
Intel Corporation, "Intel Announces Audio/Modem Riser and Mobile Daughter Card Specifications—Another Step in Removing Legacy from PC Platforms", Intel Press Release, Sep. 1998.
Intel Corporation, "Intel Cable Modem Termination System", Chapter 14: Cable Modem Termination System.
Intel Corporation, "Networking and Communication—Intel(R) PRO /100, PRO/1000 & PRO/10Gb Network Adapter ID & Driver Guide", Oct. 2003.

(Continued)

*Primary Examiner*—Paul R. Myers
(74) *Attorney, Agent, or Firm*—Haynes and Boone, LLP

(57) ABSTRACT

Apparatus provides a method and system for interfacing expansion cards having different device types to a standard connector. In this manner, the number of different types of connectors in an information handling system is reduced. One embodiment includes a direct path between the card connector and a first bus if the type of device on the expansion card is compatible with the first bus. If the type of device on the expansion card is not compatible with the first bus, then a translation path is provided between the card connector and the first bus. The translation path may include one or more integrated functions that can be selected by the expansion card according to their needs.

24 Claims, 5 Drawing Sheets

OTHER PUBLICATIONS

Intel Corporation, "Recommendations for ICHx/AC'97 Audio, Motherboard and Communication and Network Riser", pp. 1-10, Aug. 2000.

Lehwalder, et al., "CNR Audio Solutions Reduce Costs for OEMs", Intel DeveloperUPDATEMagazine, pp. 1-6, Feb. 2001.

Mayhew, et al., "PCI Express and Advantage Switching: Evolutionary Path to Building Next Generation Interconnects", StarGen, Inc.

PCI Express, "PCI Express Base Specification, Revision 1.0a", pp. 1-426, Mar. 2003.

PCI Express, "PCI Express Card Electromechanical Specification, Revision 1.0a", pp. 1-89, Mar. 2003.

PCI Express, "The Upcoming Standard at Hardware Accelerated", 2003.

"Motherboard Guide", www.mainstorm.co.uk/sub_dir3/products/motherboards/MotherboardGuide/Buses.htm.

* cited by examiner

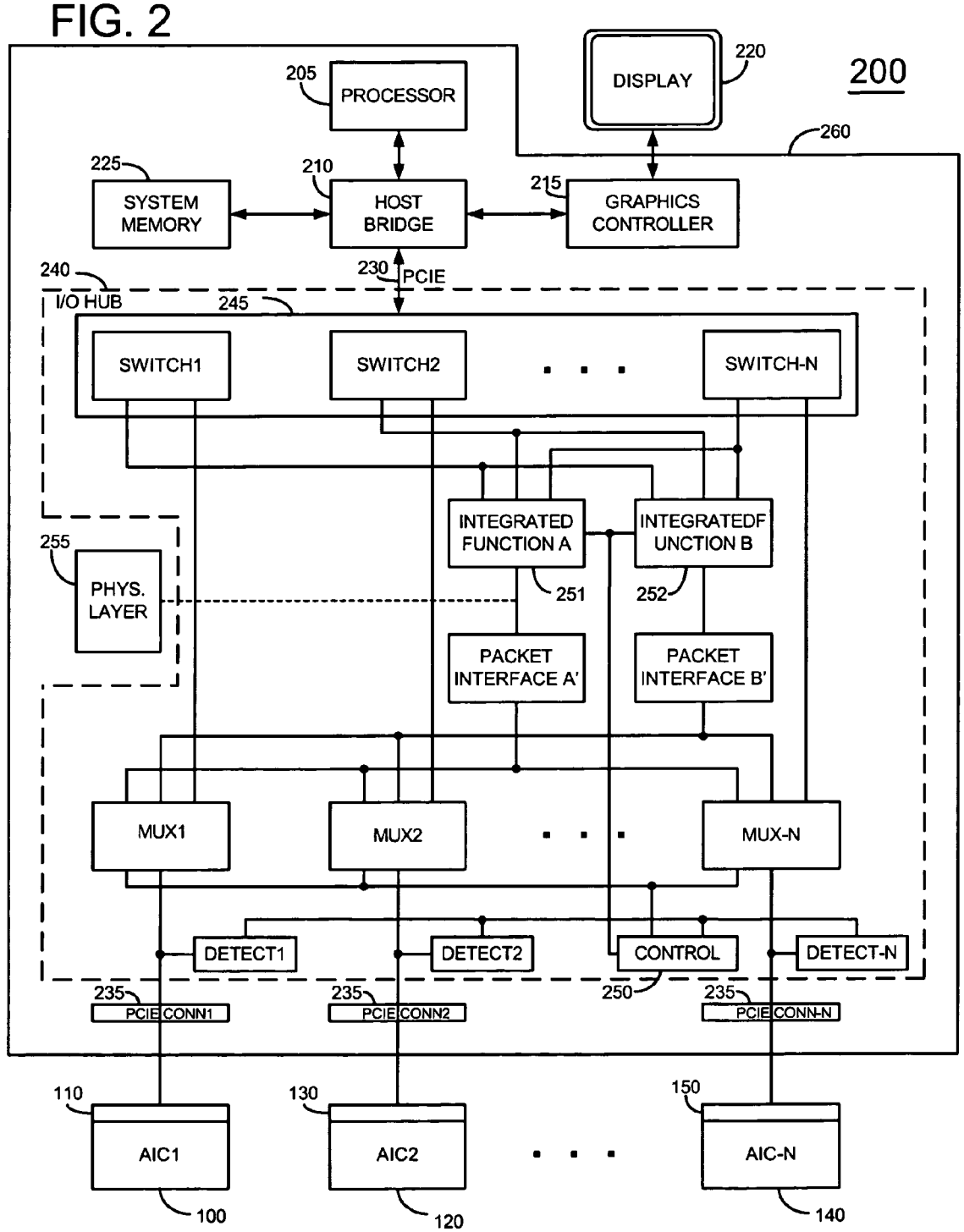

ID
INFORMATION HANDLING SYSTEM CAPABLE OF OPERATING WITH MULTIPLE TYPES OF EXPANSION CARDS IN A COMMON INDUSTRY STANDARD CONNECTOR

BACKGROUND

The disclosures herein relate generally to information handling systems (IHS's) and more particularly to reducing the number of different types of connectors employed to support different devices in information handling systems.

As the value and use of information continue to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many IHS's include a main board or motherboard in which several expansion connectors are situated on a common bus, for example, the Peripheral Component Interconnect (PCI) bus and the more recent PCI Express (PCIE) bus. Each expansion connector is capable of receiving an expansion card to provide additional capability to the system. Expansion cards are also known as add-in-cards (AICs).

In additional to these standard PCI or PCIE bus connectors, a modern IHS is likely to include several other different and unique connectors especially as more and more functionally is integrated on motherboards. Contemporary IHS's often implement functions in software, for example, audio processing, or custom hardware, for example LAN MAC. In both cases, the physical layer is generally in a separate semiconductor device due to semiconductor process and cost considerations. Frequently, these functions interface to unique physical interconnect layers. For example, the LAN function interfaces through a Media Independent audio function interfaces through an AC97 physical layer. Each of these interfaces is unique. The use of such multiple interfaces within the IHS is a significant factor in the current proliferation of multiple different unique connectors in the IHS. For example, AMR connectors are used to support "Audio Modem Riser" cards and CMR connectors are used to support "Communication Modem Riser" cards. Each of these connectors is different from the other and is also different from the PCI or PCIE connectors used for AICs in IHSs.

What is needed is a way to reduce the number of different unique connectors in an information handling system while still permitting increased functionality to be integrated in the information handling system.

SUMMARY

Accordingly, in one embodiment, a method of operating an information handling system is provided. The method includes providing an add-in-card (AIC) connector exhibiting a first bus standard. The AIC connector is capable of accepting both AICs compatible with the first bus standard and AICs not compatible with the first bus standard. The method also includes providing a direct path between the AIC connector and a first bus when an AIC exhibiting the first bus standard is plugged into the AIC connector. The method further includes providing a translation path between the AIC connector and the first bus when an AIC exhibiting a standard other than the first bus standard is plugged into the AIC connector.

In another embodiment, an information handling system (IHS) is disclosed which includes a processor and a memory coupled to the processor by a host bridge. The IHS includes a first bus exhibiting a first bus standard, the first bus being coupled to the host bridge. The IHS also includes an add-in-card (AIC) connector compatible with the first bus standard, the AIC connector accepting both AICs compatible with the first bus standard and AICs not compatible with the first bus standard. The IHS further includes a direct path between the AIC connector and the first bus for use when an AIC exhibiting the first bus standard is plugged into the AIC connector. The IHS still further includes a translation path between the AIC connector and the first bus for use when an AIC exhibiting a standard other than the bus standard is plugged into the AIC connector.

BRIEF DESCRIPTION OF THE DRAWINGS

FIG. 2 is a block diagram an embodiment of an information handling system employing the disclosed IHS.

DETAILED DESCRIPTION

One embodiment of the disclosed information handling system (IHS) features the ability to interface with a variety of physical devices through a standardized physical interface such as PCIE connectors for example. This reduces the need for multiple standard but different connectors in the IHS. The disclosed IHS will accept both PCIE and non-PCIE standard add-in-cards (AICs) in respective PCIE connectors. However, it should be noted that the disclosed technology can be applied to other bus standards as well.

For purposes of this disclosure, an information handling system (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1A:
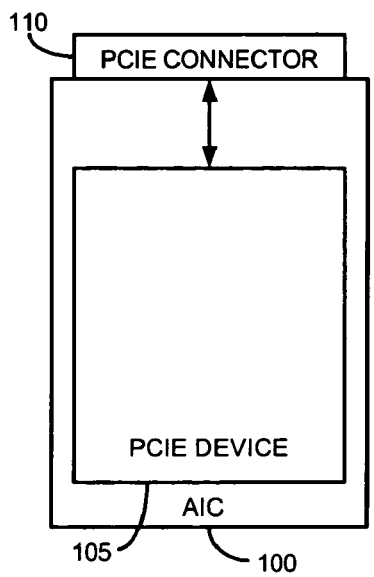
FIG. 1A is a block diagram of an embodiment of an add-in-card (AIC) including a PCIE device.

FIG. 1A is a block diagram of an add-in-card (AIC) 100 which includes a PCIE device 105 coupled to a PCIE connector 110. This is an example of one type of AIC which can be coupled to one of a group of like bus connectors in the IHS.

Figure 1B:
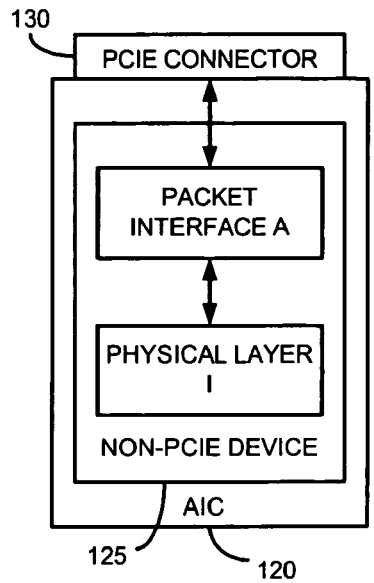
FIG. 1B is a block diagram of an embodiment of an AIC including a non-PCIE device

FIG. 1B is a block diagram of an AIC 120 which includes a non-PCIE device 125. Non-PCIE device 125 includes a physical layer I which is coupled to a packet interface A. Packet interface A is coupled to a PCIE connector 130. This is an example of another type of AIC that can be coupled to one of a group of like bus connectors in the IHS.

Figure 1C:
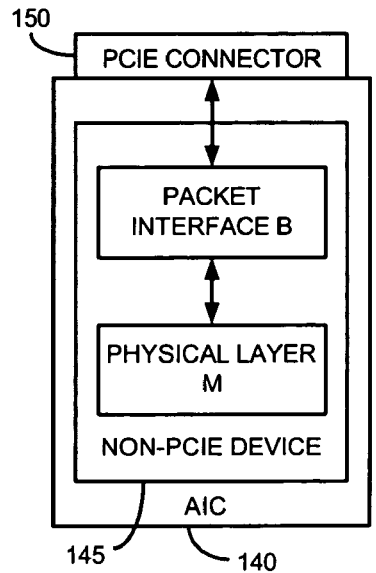
FIG. 1C is a block diagram of another embodiment of an AIC including a non-PCIE device.

FIG. 1C is a block diagram of an AIC 140 which includes a non-PCIE device 145. Non-PCIE device 145 includes a physical layer M which is coupled to a packet interface B. Packet interface B is coupled to a PCIE connector 150. This is an example of another type of AIC that can be coupled to one of a group of like bus connectors in the IHS.

FIG. 2 is a block diagram of an information handling system (IHS) 200 which accommodates multiple functions without an accompanying proliferation of different unique connectors for each function. Information handling system (IHS) 200 includes a processor 205 such as an Intel Pentium series processor or one of many other processors currently available. A host bridge 210, colloquially referred to as a Northbridge, is coupled to processor 205 as shown. Host bridge 210 includes core logic that connects processor 205 to other components of IHS 200. In one embodiment, host bridge 120 serves as a bridge between processor 200 and graphics/memory controller hardware. More specifically, host bridge 210 acts as a host controller that communicates with a graphics controller 215 which is coupled to a display 220. Host bridge 210 also acts as a controller for system memory 225 which is coupled thereto.

Host bridge 210 includes a PCIE output which is coupled to a PCIE link or bus 230. PCIE link 230 is coupled to I/O hub 240 which includes a plurality of like PCIE outputs 235 which are also designated as PCIE connectors PCIECONN1, PCIECONN2, . . . PCIECONN-N wherein N is the maximum number of AICs which the particular IHS 200 is to accommodate at one time in N respective connectors. These PCIE connectors are all designated as PCIE connectors 235 because they are substantially the same type of industry standard connector. Any one of PCIE connectors 235 can receive any one of AICs 100, 120 and 140 of FIGS. 1A–1C therein whether the respective card includes a PCIE device or a non-PCIE device. For discussion purposes it assumed that a PCIE device AIC 100 is connected to PCIECONN1 and that non PCIE device AICs 120 and 140 are connected to PCIECONN2 and PCIECONN-N. In this example, there are 3 PCIECONN connectors such that N=3. The disclosed technology can accommodate a larger number of connectors and AICs as well.

I/O Hub 240 includes a bank of PCIE switches 245, namely the switches designated SWITCH1, SWITCH2, SWITCH-N coupled to PCIE link 230. The scenario wherein a PCIE AIC1 is connected to connector PCIECONN1 is now discussed. Connecting a PCIE AIC such as AIC1 to a connector 235, such as PCIECONN1 in this example, results in "straight through" or "direct through mode" of operation for which no translation path is needed. In this straight through operation mode, PCIE link 230 is coupled to AIC1 via the switch SWITCH1 and multiplexer, MUX1. I/O hub 240 includes multiplexers MUX1, MUX2 . . . MUX-N as shown for coupling respective AICs to other components within I/O hub 240 as later described in more detail. I/O hub 240 also includes detect circuits DETECT1, DETECT2, . . . DETECT-N for detecting the presence of AICs in respective connectors PCIECONN1, PCIECONN2, . . . PCIECONN-N. Each detect circuit not only detects if an AIC is present in its respective connector, but also identifies the type of AIC which is plugged into the connector. In other words, the detect circuits determine whether a PCIE AIC or a non-PCIE AIC is plugged into a particular connector PCIECONN1, PCIECONN2, . . . PCIECONN-N. Detect circuits DETECT1, DETECT2, . . . DETECT-N are all connected to a control circuit 250 the operation of which will be discussed in more detail later with reference to the flow chart of FIG. 5. Recapping so far, a card AIC1 has been placed in connector PCIECONN1. The presence of AIC1 is detected by detect circuit DETECT1 which reports the presence of AIC1 to control circuit 250. Control circuit 250 instructs multiplexer MUX1 to connect connector PCIECONN1 to switch SWITCH1 which connects to PCIE link 230 via SWITCH1 to MUX1 and PCIECONN1. A "straight through" or direct path is thus formed between PCIE link 230 and PCIE card IAC1.

It is noted that non-PCIE AICs employ a different protocol than PCIE AICs. A scenario is now discussed wherein a non-PCIE device add-in-card (AIC), is placed in one of PCIECONN connectors 235. In this example, AIC 120 of FIG. 1B is placed in connector PCIECONN2 of FIG. 2. AIC 120 includes a non-PCIE device 125 such as audio codec. Packet interface A of AIC 120 acts as a protocol translator for physical layer I of AIC 120. Returning to FIG. 2, I/O hub 240 includes a corresponding packet interface A' which also acts as a protocol translator when AIC 120 is plugged in. In this example, wherein AIC 120 is an audio card, physical layer I is an audio physical layer. Packet interface A' is coupled to INTEGRATED FUNCTION A (251) in I/O hub 240 as shown. In this particular example, an audio function is integrated in I/O hub 240. I/O hub 240 may be implemented as a single integrated circuit or multiple integrated circuits depending on the particular application. In one embodiment, when a non-PCIE audio AIC 120 is plugged into PCIECONN2, the physical layer in AIC 120 augments or works together with INTEGRATED FUNCTION A in I/O hub 240. A translation path is thus provided for non PCIE AIC 120 by packet interface A, connector PCIE-CONN2, packet interface A1 and INTEGRATED FUNCTION A.

The internal operation of I/O hub 240 when a non-PCIE AIC is plugged in is now discussed in more detail. When AIC 120 is plugged into connector PCIECONN2, the detect circuit DETECT2 detects the presence of the non-PCIE AIC. Detect circuit DETECT2 informs control circuit 250 that the presence of non-PCIE card 120 is detected. Control circuit 250 causes multiplexer MUX2 to connect connector PCIECONN2 to packet interface A' and causes SWITCH2 to connect PCIE link 230 to INTEGRATED FUNCTION A. Control circuit 250 then informs INTEGRATED FUNCTION A that AIC 120 is plugged in. The actions described above occur before the IHS's basic input output system (BIOS) and operating system (OS) load. The BIOS and OS are typically stored in nonvolatile storage (not shown) in IHS 200.

In this particular examples, INTEGRATED FUNCTION A is an audio function and INTEGRATED FUNCTION A sends audio information received from PCIE link 230 across SWITCH2 to packet interface A' which acts as a protocol translator to packetize the audio information. The packetized audio information is sent via MUX2 and connector PCIECONN2 to non PCIE AIC 120 for additional handling.

In one embodiment, a physical layer 255, such as an audio physical layer, is situated on a motherboard 260 in IHS 200. Physical layer 255 is coupled to INTEGRATED FUNCTION A packet interface A' as shown. AIC2 works in conjunction with INTEGRATED FUNCTION A to provide audio functionality. It is noted that PACKET INTERFACE A of AIC 120 cooperates with PACKET INTERFACE A' to transfer audio information back and forth between PCIE link 230 and AIC 120. When PACKET INTERFACE A' acts as a packetizer, PACKET INTERFACE A of AIC 120 acts as a de-packetizer, and vice versa. Physical layer 255 is an AC'97 compatible codec in one embodiment of IHS 200.

A scenario wherein a second non-PCIE device add-in-card (AIC) is placed in one of PCIECONN connectors 235 is now discussed. For this example, non-PCIE AIC 140 of FIG. 1C is plugged into connector PCIECONN-N of FIG. 2. The number of connectors 235 in this example is 3 and thus N=3. When PCIE AIC 140 is plugged into PCIECONN-N, detect circuit DETECT-N detects the presence of this AIC. Detect circuit DETECT-N informs control circuit 250 that the presence of non-PCIE card 140 has been detected. Control circuit 250 causes multiplexer MUX-N to connect connector PCIECONN-N to packet interface B' and causes SWITCH-N to connect PCIE link 230 to INTEGRATED FUNCTION B (252). In this particular example, integrated function B is a communication function such as a modem function. Physical layer M in AIC 140 is a modem physical layer which operates in conjunction with modem functionality provided by INTEGRATED FUNCTION B. It is noted that PACKET INTERFACE B of AIC 140 cooperates with PACKET INTERFACE B' to transfer modem information back and forth between PCIE link 230 and AIC 140. When PACKET INTERFACE B' acts as a packetizer, PACKET INTERFACE B of AIC 140 acts as a de-packetizer, and vice versa.

Figure 3A:
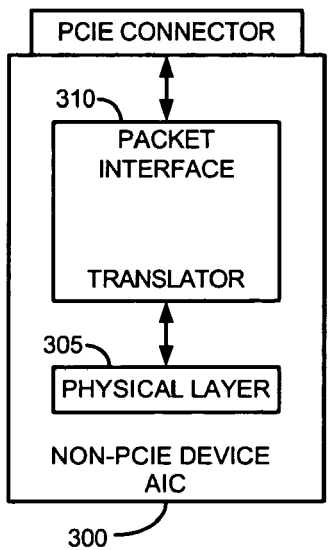
FIG. 3A–3C are block diagrams of three embodiments of non-PCIE type AICs.

FIG. 3A is a representation of one type of non-PCIE AIC 300 that can be plugged into PCIE connectors 235 of IHS 200. Non PCIE AIC 300 includes a physical layer 305 coupled to block 310 which functions as a translator and packet interface.

Figure 3B:
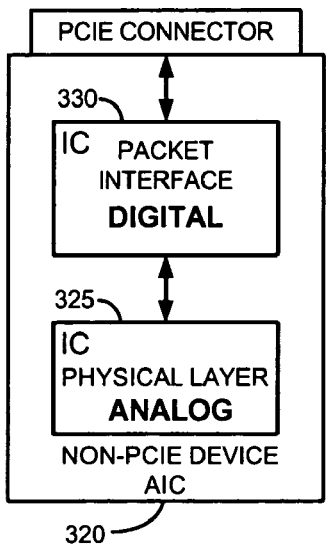

FIG. 3B is a representation of another type of non-PCIE AIC 320 that can be plugged into PCIE connectors 325 of IHS 200. AIC 320 includes 2 integrated circuits (ICs) dedicated to handling analog and digital processing, respectively. More specifically, AIC 320 includes an analog integrated circuit 325 and a digital integrated circuit 330. Analog integrated circuit 325 includes the physical layer associated with the function of the AIC, for example an audio processing physical layer. Analog physical layer 235 is coupled to a digital integrated circuit 330 which includes a packet interface.

Figure 3C:
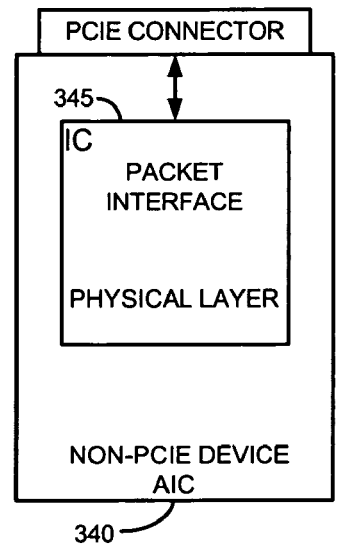

FIG. 3C is a representation of yet another type of non-PCIE AIC 340 which can be plugged into PCIE connectors 235 of IHS 200. AIC 340 is similar to AIC 320 except in AIC 340 the digital and analog circuits are combined in a common integrated circuit 345. Integrated circuit 345 includes both a physical layer and a packet interface.

Figure 4:
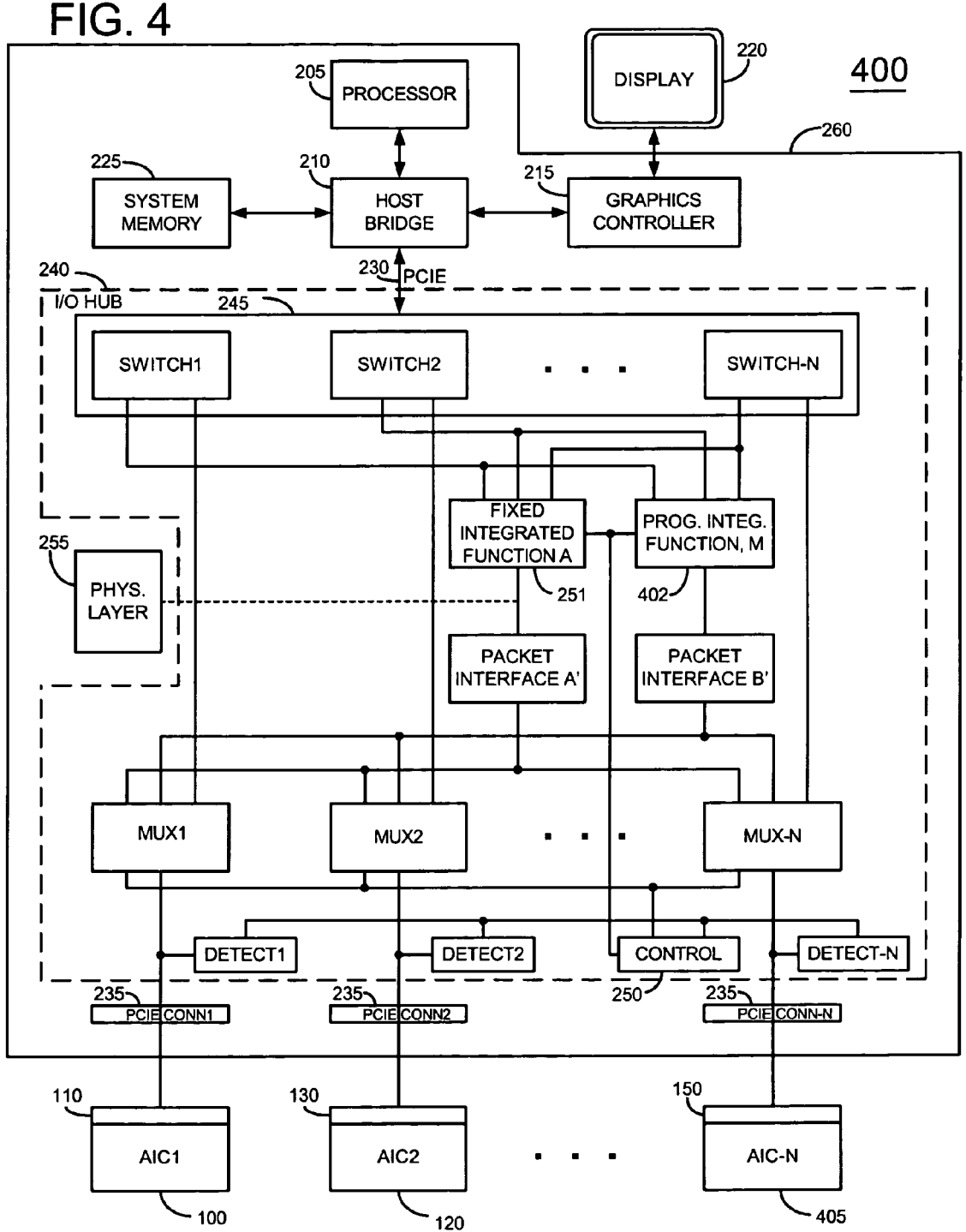
FIG. 4 is a block diagram of another embodiment of the disclosed IHS.

It will be recalled that IHS 200 of FIG. 2 includes 2 fixed integrated functions, namely INTEGRATED FUNCTION A (251) and INTEGRATED FUNCTION B (252). FIG. 4 shows another embodiment of the IHS as IHS 400. IHS 400 is similar to IHS 200 of FIG. 2 with like numbers indicating like elements. However, instead of a second fixed integrated function (INTEGRATED FUNCTION B (252), IHS 400 includes a programmable or variable integrated function 402 (INTEGRATED FUNCTION M) in addition to fixed integrated function 251. Thus, the particular embodiment shown in FIG. 4 supports 1 fixed integrated function and 1 programmable integrated function. Other IHS embodiments are possible with more than one programmable integrated function block 402 and more than one fixed integrated function block 251. In the particular embodiment shown in FIG. 4, programmable integrated function block 402 is capable of implementing multiple integrated functions depending on the nature of the physical layer of the particular AIC plugged into connector PCICONN-N.

The operation of programmable integrated function or block 402 is now discussed in more detail. In this example, it is assumed that programmable function block 402 is capable of implementing a wired MAC (media access control) function and a wireless MAC function, depending on the particular AIC plugged into PCIECONN-N. Programmable function block 402 includes wired MAC code therein which is capable of implementing a wired MAC function as well as wireless MAC code which is capable of implementing a wireless MAC function. If an AIC 405 (i.e. AIC-N) having a wired MAC physical layer is connected to connector PCIECONN-N, the presence of AIC 405 is detected by detect circuit DETECT-N. Detect circuit DETECT-N informs control circuit 205 that AIC 405 is plugged in. It is noted that each AIC has a unique device ID associated therewith to designate its functionality. For example, AIC 405 includes a device ID indicating that it has a wired MAC physical layer. This device ID is reported by control circuit 250 to programmable integrated function 402 which is then programmed to implement the appropriate wired MAC function. Programmable integrated function block 402 switches its program to implement the wired MAC function requested by the AIC plugged into connector PCIECONN-N. In other words, upon detection of the wired MAC card type, programmable integration function block 402 branches to and executes the stored wired MAC code which defines that programmable interface. However, If instead of a wired MAC physical layer, an AIC 405 with a wireless MAC physical layer is plugged into connector PCCONN-N, the device ID of this AIC 405 is reported back to programmable integrated function 402. In response, programmable integrated function 402 switches or branches to the wireless MAC code or program which implements the wireless MAC function. In either case, programmable integrated function 402 implements the appropriate function indicated by the device ID of the particular AIC 405 and indicated by its physical layer. As part of this detection and control operation, switch SWITCH-N is coupled to PCIE link 230 thus connecting programmable integrated function 402 to host bridge 210. The device ID of AIC 405 is reported to processor 205 over this connection. Also as part of this detection and control operation, multiplexer MUX-N connects the AIC 405 (i.e. AIC-N) in connector PCIECONN-N to PACKET INTERFACE B' which is coupled to programmable integrated function 402. It is noted that AIC 405 includes a corresponding packet interface PACKET B, not shown. When PACKET INTERFACE B' acts as a packetizer, PACKET INTERFACE B of AIC 405 acts as a de-packetizer, and vice versa. From the above it will be appreciated that programmable integrated function block 402 is programmable in the sense that it can implement different integrated functions upon command or request from the AIC plugged into connector PCIECONN-N. Thus, function block 402 may also be referred to as a variable function block or a multiple function block. The programmed function of programmable integrated function block 402 switches to implement the particular function desired as indicated by the corresponding AIC.

Figure 5:
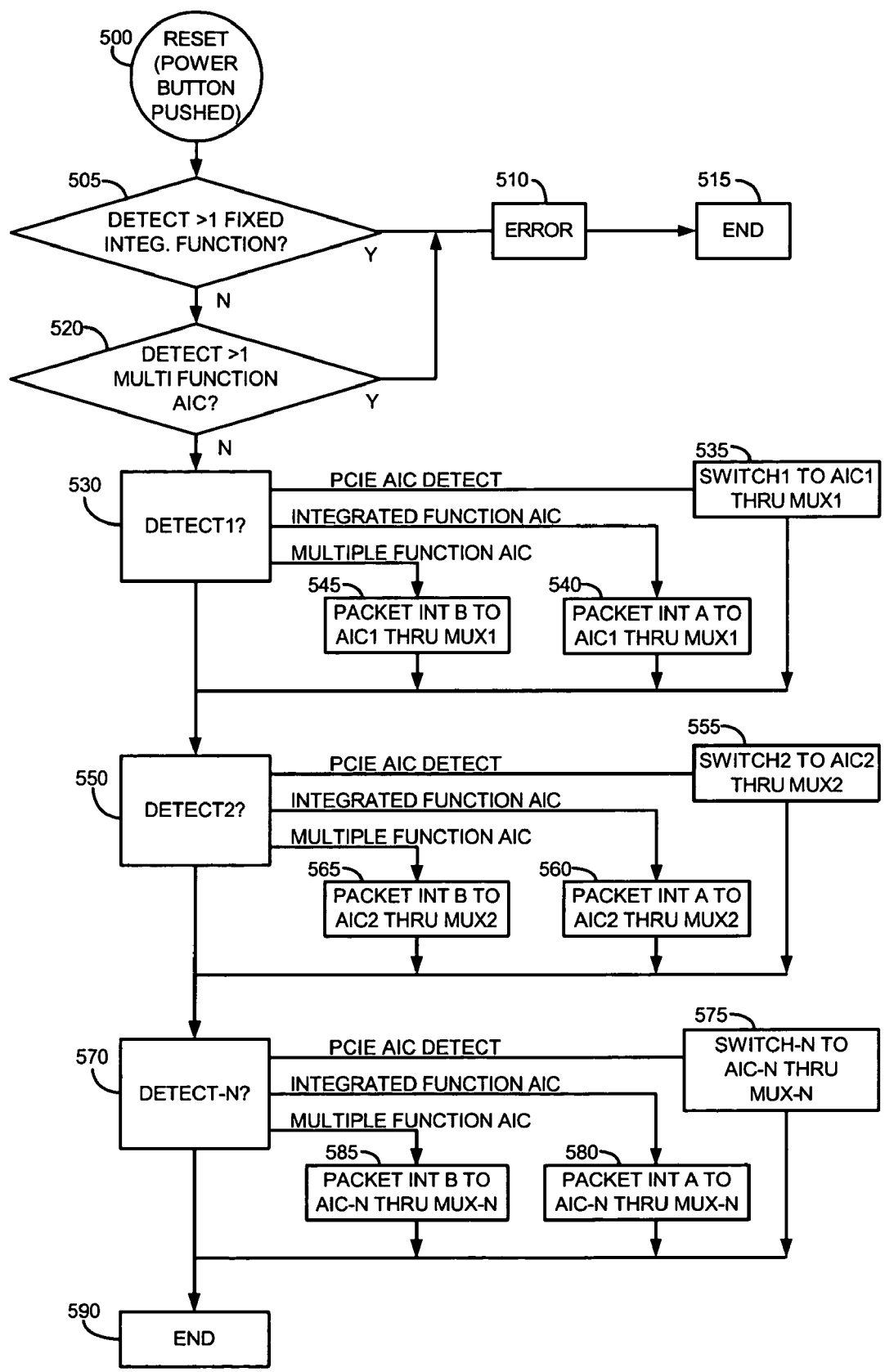
FIG. 5 is a flow chart depicting the operation of the IHS of FIG. 4.

FIG. 5 is a flowchart depicting the operation of IHS 400. Operation commences as per block 500 when the power button of the system is pressed or reset. It will be recalled that IHS 400 includes one fixed integrated function 251 and one programmable integrated function 402. Each of these functions can accommodate one corresponding AIC. Thus, an error condition exists if there is more than one AIC installed which calls for a fixed integrated function. A test is conducted at decision block 505 to determine if more than one AIC calling for a fixed integrated function has been detected. If so, an error condition exists as per block 510 and processing halts as per end block 515. In this particular embodiment, it is also an error if AICs are installed which call for more than one programmable integrated function. This condition is detected in decision block 520 and if found an error is reported at error block 510. The process then ends at end block 515.

It should be noted that embodiments are possible in which the system contains more than 1 fixed integrated function, for example J integrated functions, If so, decision block 505 would test for J integrated functions. It is also possible that the system contains more than 1 programmable function, for example K programmable functions. If so, decision block 510 would test for K programmable functions.

If no such errors are found, then processing continues to detect circuit decision blocks 530, 550 and 570 which operate in parallel. Each of these detect circuit decision blocks tests to see if an AIC is installed in a respective PCIE connector. More specifically, DETECT1 decision block 530 tests AIC1 installed in connector PCIECONN1 as follows. If a PCIE device type AIC1 is detected, then SWITCH1 and MUX1 are configured to connect AIC1 to PCIE link 230 as per block 535. This is referred to as "straight through" or direct operation. However, if a non-PCIE device integrated function type AIC1 is detected then, MUX1 is configured to connect AIC1 with its packet interface A to packet interface A' as per block 540. Finally, if a non-PCIE device programmable function or multiple function AIC1 is detected, then MUX1 is configured to connect AIC1 to packet interface B' as per block 545. As discussed earlier, programmable function block 402 is capable of programmably implementing multiple functions. In this case programmable function block 402 will implement the particular function called for by the device ID associated with non PCIE device type AIC1. A multiple function AIC is one that can call upon programmable integrated function block 402 to implement one of multiple selectable functions.

The scenario wherein detect circuit DETECT2 detects an AIC in connector PCIECONN2 is now discussed with reference to DETECT2 decision block 550. More specifically, DETECT2 decision block 550 tests AIC2 installed in connector PCIECONN2 as follows. If a PCIE device type AIC2 is detected, then SWITCH2 and MUX2 are configured to connect AIC2 "straight through" to PCIE link 230 as per block 555. However, if a non-PCIE device integrated function type AIC2 is detected then, MUX2 is configured to connect AIC2 with its packet interface A to packet interface A' of AIC2 as per block 560. Finally, if a non-PCIE device programmable function or multiple function AIC2 is detected, then MUX2 is configured to connect AIC2 to packet interface B' as per block 545. Again, programmable function block 402 is capable of programmably implementing multiple functions. In this case programmable function block 402 will implement the particular function called for by the device ID associated with non PCIE device type AIC2.

And last, the scenario wherein detect circuit DETECT-N detects an AIC in connector PCIECONN-N is now discussed with reference to DETECT-N decision block 570. More specifically, DETECT-N decision block 570 tests AIC-N installed in connector PCIECONN-N as follows. If a PCIE device type AIC-N is detected, then SWITCH-N and MUX-N are configured to connect AIC-N "straight through" or directly to PCIE link 230 as per block 575. However, if a non-PCIE device integrated function type AIC-N is detected, then MUX-N is configured to connect AIC-N with its packet interface A to packet interface A' of AIC-N as per block 580. Finally, if a non-PCIE device programmable function or multiple function AIC-N is detected, then MUX-N is configured to connect AIC-N to packet interface B' as per block 545. In this case programmable function block 402 will exhibit the particular function called for by the device ID associated with non PCIE device type AIC-N. With the above activities complete, the detection and configuration process ends as per end block 590. It is noted that embodiments are possible wherein the detect blocks continue to test for placement of AICs in the respective PCIE connectors during IHS operation. If a change is detected, the system is reset and the process shown in the flowchart of FIG. 5 is run again.

Figure 6A:
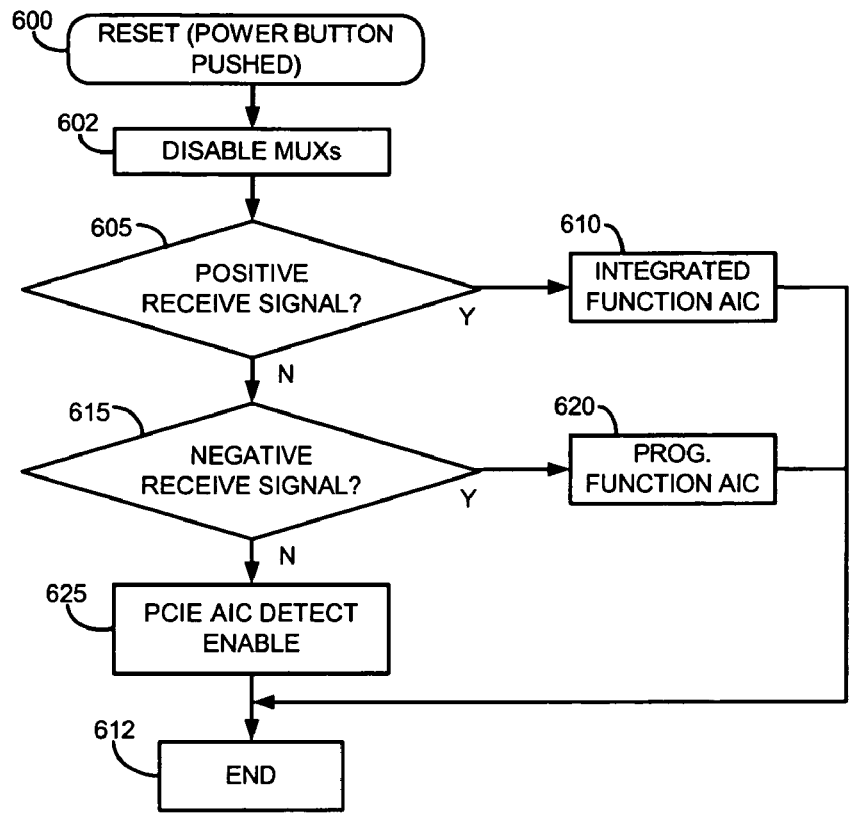
FIG. 6A is a flow chart depicting an embodiment of the AIC type detection process carried out by the IHS.

FIG. 6A is a flow chart providing more detail regarding how the detect operation of detect circuits DETECT1, DETECT2, . . . DETECT-N is implemented at the electrical level. For example purposes, detect circuit DETECT1 is described below. However, the same discussion applies as well to DETECT2, . . . DETECT-N. In one implementation, non PCIE cards will generate high frequency pulses on either a positive line (not shown) or the negative line (not shown) thereof to indicate whether such non PCIE card is the fixed integrated function type or the programmable integrated function type card, respectively. Of course other approaches can be employed to enable the detect circuits to distinguish the particular type of physical layer that is on a non-PCIE type AIC. Detect circuit DETECT1 monitors signals from from AIC1 to determine if AIC1 is 1) a native PCIE AIC for which "direct through" operation is employed; 2) a NON-PCIE card to be used with a fixed integrated function; or 3) a NON-PCIE card to be used with a programmable integrated function.

Operation commences with a system reset as per block 600. Multiplexers MUX1, MUX2, . . . MUX-N are then disabled as per block 602 The lines between AIC1 and I/O hub 240 are now in an idle state. Detect circuit DETECT1 monitors AIC1. If detect circuit DETECT1 finds a positive AIC signal at decision block 605, then the particular AIC1 is determined to be a non-PCIE type fixed integrated function AIC as per block 610. The card detect process is now complete for this particular AIC1 as per end block 612. If a positive AIC signal was not found at decision block 605, then additional testing is performed. Decision block 615 tests to determine if the AIC signal is negative and if so, the particular AIC1 is determined to be a non-PCIE type programmable integrated function AIC as per block 620. The detection process then ends at block 612. However, if the AIC signal is neither positive nor negative, then it is determined that the particular AIC1 is a native PCIE type AIC as per block 625 and the detect process ends at block 612. Similar testing is performed on AICs in the other PCIE connectors if such cards are present.

If an AIC, such as AIC2 for example, is determined to be a programmable type AIC then the system branches to stored code which is loaded into programmable integrated function 402 to causes function 402 to implement the desired function. In addition, an appropriate device ID is assigned to AIC2 in conjunction with programmable function 402 so that standard files and operating system (OS) mechanisms then see a correct ID as part of the enumeration process.

Figure 6B:
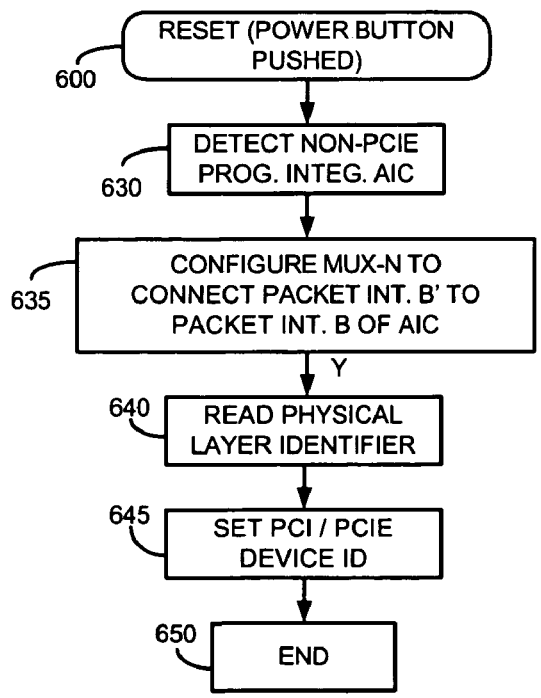
FIG. 6B is a flow chart depicting an embodiment of the process of configuring the IHS for supporting a non PCIE type AIC which calls for a programmable integrated function.

To provide more detail, FIG. 6B is a flowchart depicting the operation of IHS 400 after it is reset at block 600 and a non-PCIE type programmable integrated function AIC, for example AIC2, has been detected by a detect circuit as per block 630. Once such detection occurs, control circuit 250 causes packet interface B' to be coupled through MUX-N to a corresponding packet interface B in AIC 140 of FIG. 1C as per block 635. This effectively connects the AIC to programmable integrated function M, namely programmable integrated function 402 as seen in FIG. 4. The physical layer identifier or device ID associated with AIC 140 physical layer M of FIG. 1C is then read as per block 640. Then in block 640 the PCI/PCIE device ID of programmable integrated function block is then set to the ID read in block 640. Programmable integrated function M (here indicated as 402) then assumes the particular function associated with that ID. For example, if the physical layer identifier associated with AIC 140 is a wireless MAC radio layer, then programmable integrated function block then switches to providing a wireless MAC integrated function. Standard BIOS and OS mechanisms then see the correct device IDs as part of the enumeration process that occurs as the system commences operation.

An IHS is thus provided which is capable of accepting multiple types of expansion cards via common industry standard connectors for such cards. AICs which are do not natively support the standard connector are connectable as well as those AICs that natively support the common connector. While a PCIE standard connector implementation has been shown for example purposes, the teachings herein can be applied to other present and future bus connectors as well.

The disclosed methodology allows multiple functions to connect to physical layers depending on what particular AIC is plugged into an industry standard PCIE connector or slot. A PCIE link is used to communicate a custom or standard PCIE protocol to an AIC compatible with the industry standard PCIE connector. The physical layer of an AIC is discovered and configuration of the various switches, MUXs and functions is completed prior to system boot. When a PCIE AIC using PCIE protocol is plugged into a PCIE connector, the PCIE protocol as passed directly through to a PC link because the native PCIE protocol requires no translation. Translation services are provided to the non-PCIE protocols from non-PCIE AICs that are plugged into the PCIE connectors. In this manner both PCIE and non-PCIE AICs are accommodated in the same industry standard connector.

Although illustrative embodiments have been shown and described, a wide range of modification, change and substitution is contemplated in the foregoing disclosure and in some instances, some features of an embodiment may be employed without a corresponding use of other features. Accordingly, it is appropriate that the appended claims be construed broadly and in manner consistent with the scope of the embodiments disclosed herein.

What is claimed is:

1. A method of operating an information handling system comprising:
providing an add-in-card (AIC) connector exhibiting a first bus standard, the AIC connector accepting both AICs compatible with the first bus standard and AICs not compatible with the first bus standard;
providing a direct path between the AIC connector and a first bus when an AIC exhibiting the first bus standard is plugged into the AIC connector; and
providing a translation path between the AIC connector and the first bus when an AIC exhibiting a standard other than the first bus standard is plugged into the AIC connector.

2. The method of claim 1 wherein an AIC employs a first protocol.

3. The method of claim 2 wherein the AIC employs a second protocol different from the first protocol.

4. The method of claim 2 wherein the AIC includes a PCIE device.

5. The method of claim 3 wherein the AIC includes a non-PCIE device.

6. The method of claim 3 wherein the translation path includes an integrated function block which exhibits a function needed by the AIC.

7. The method of claim 3 wherein the integrated function is a fixed integrated function.

8. The method of claim 7 wherein the integrated function is an audio function.

9. The method of claim 7 wherein the integrated function is a communications function.

10. The method of claim 3 wherein the translation path includes a plurality of integrated function blocks, each integrated function block exhibiting a different function.

11. The method of claim 3 wherein the translation path includes a programmable integrated function block which is capable of providing a plurality of functions.

12. The method of claim 11 including requesting by the AIC that the programmable integrated function block switch to providing a function requested by the AIC.

13. An information handling system (IHS) comprising:
a processor;
a memory coupled to the processor by a host bridge;
a first bus exhibiting a first bus standard, the first bus being coupled to the host bridge;
an add-in-card (AIC) connector compatible with the first bus standard, the AIC connector accepting both AICs compatible with the first bus standard and AICs not compatible with the first bus standard;
a direct path between the AIC connector and the first bus for use when an AIC exhibiting the first bus standard is plugged into the AIC connector; and a translation path between the AIC connector and the first bus for use when an AIC exhibiting a standard other than the bus standard is plugged into the AIC connector.

14. The IHS of claim 13 wherein an AIC in the AIC connector employs a first protocol.

15. The IHS of claim 14 wherein an AIC in the AIC connector employs a second protocol.

16. The IHS of claim 14 wherein the AIC includes a PCIE device.

17. The IHS of claim 15 wherein the AIC includes a non-PCIE device.

18. The IHS of claim 15 wherein the translation path includes an integrated function block which exhibits a function needed by the AIC.

19. The IHS of claim 18 wherein the integrated function block exhibits fixed integrated function.

20. The IHS of claim 18 wherein the function is an audio function.

21. The IHS of claim 18 wherein the function is a communications function.

22. The IHS of claim 15 wherein the translation path includes a plurality of integrated function blocks, each integrated function block exhibiting a different function.

23. The IHS of claim 15 wherein the translation path includes a programmable integrated function block which is capable of providing a plurality of different selectable functions.

24. Apparatus for operating an information handling system (IHS) comprising:

a host bridge;

a first bus exhibiting a first bus standard, the first bus being coupled to the host bridge;

an add-in-card (AIC) connector compatible with the first bus standard, the AIC connector accepting both AICs compatible with the first bus standard and AICs not compatible with the first bus standard;

a direct path between the AIC connector and the first bus for use when an AIC exhibiting the first bus standard is plugged into the AIC connector; and a translation path between the AIC connector and the first bus for use when an AIC exhibiting a standard other than the bus standard is plugged into the AIC connector.

* * * * *